July 29, 1930.  E. L. MERZOIAN  1,771,503
LEMON SQUEEZER
Filed July 14, 1928   2 Sheets-Sheet 1

INVENTOR
E. L. Merzoian
BY
ATTORNEY

July 29, 1930.  E. L. MERZOIAN  1,771,503
LEMON SQUEEZER
Filed July 14, 1928   2 Sheets-Sheet 2

INVENTOR
E. L. Merzoian
BY
ATTORNEY

Patented July 29, 1930

1,771,503

UNITED STATES PATENT OFFICE

EDWARD L. MERZOIAN, OF PORTERVILLE, CALIFORNIA

LEMON SQUEEZER

Application filed July 14, 1928. Serial No. 292,868.

This invention relates to hand operated devices for extracting the juice from lemons, oranges, and the like; my principal object being to provide a portable implement for the purpose, especially intended and adapted for household use, by means of which all the juice may be quickly and easily extracted from the fruit with a minimum of exertion on the part of the operator.

A further object is to provide a device for the purpose having a fruit cutting knife arranged as a unitary part of the structure, so that the buyer of the implement has everything at hand necessary for the cutting and squeezing of the fruit.

Another object is to form and mount the juice receiving bowl of the apparatus in such a manner that it need not be lifted to drain the juice, but instead the juice will discharge automatically and continuously into any suitable receptacle placed in a proper position.

Means is provided in the implement for holding the piece of fruit to be squeezed instead of the same being retained in the hand as is commonly the case, and a further object of my invention is to provide easily actuated ejecting means for the fruit after it has been squeezed. In this manner the only manual handling of the fruit is that necessary in connection with its initial cutting and the placing of the same in the holding member.

These objects I accomplish by means of such structure and relative arrangement of parts as will fully appear by a perusal of the following specification and claims.

In the drawings similar characters of reference indicate corresponding parts in the several views.

Figure 1:
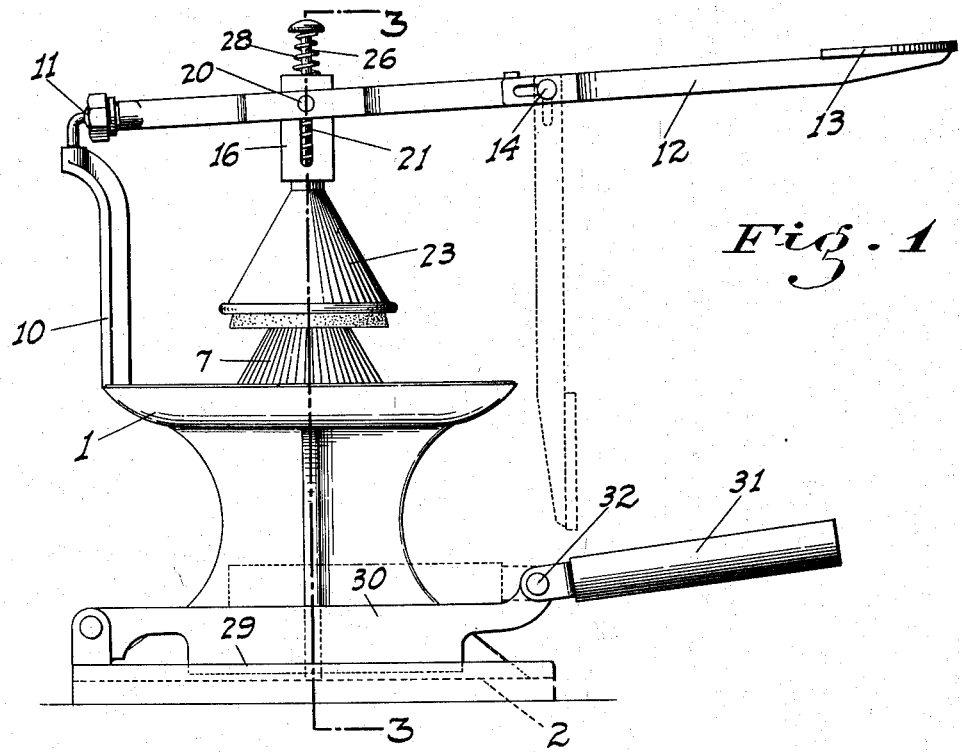
Fig. 1 is a side elevation of my improved lemon squeezer.
Figure 2:
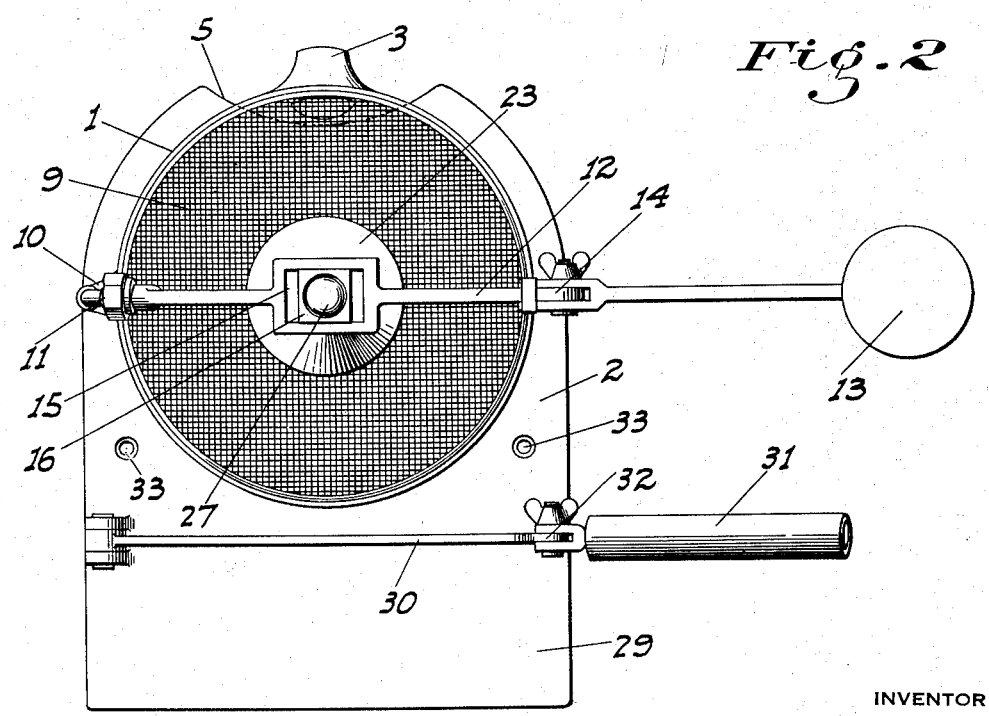
Fig. 2 is a top plan view of the same.
Figure 3:
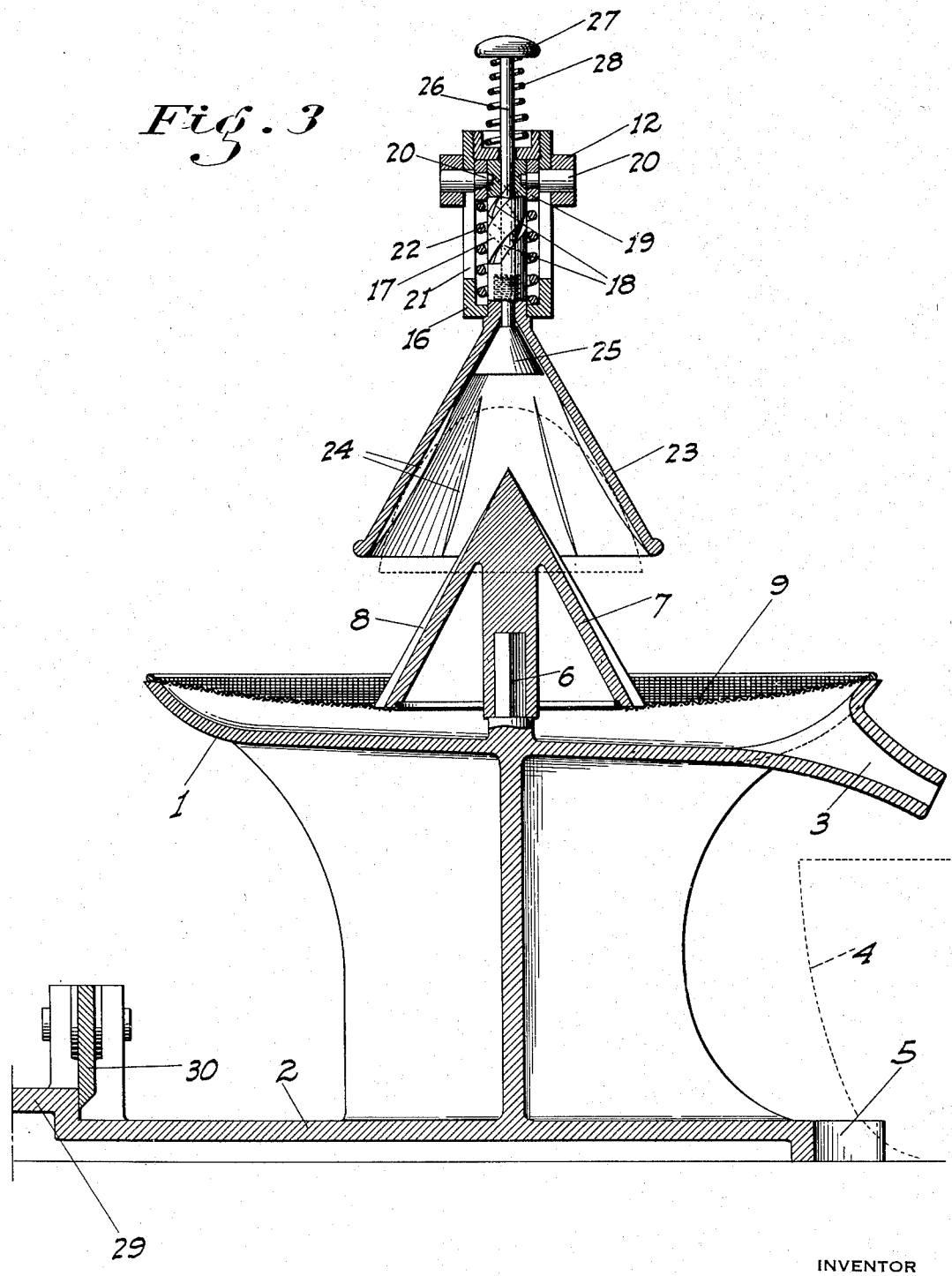
Fig. 3 is an enlarged vertical section taken on the line 3—3 of Fig. 1.

Referring now more particularly to the characters of reference on the drawings, the numeral 1 denotes a shallow juice catching bowl formed as an integral unit with a flat base 2 of considerable area, said bowl being disposed at a height above the base greater than that of an ordinary cup. The bowl slopes down toward one side and at its lowest point has a discharge spout 3 leading therefrom. This spout is adapted to overhang an ordinary cup 4 or similar vessel placed under the same, the base being recessed as at 5 under the spout to form a locating means for the cup.

Projecting upwardly from the bowl centrally thereof, is a stem 6 on which is nonturnably but removably mounted a juice extracting cone 7 of common form and having a plurality of sharp edged ribs or corrugations 8, extending from the top to the bottom on the outside thereof. Fixed in connection with the cone and removable therewith is a concave screen 9, extending over the surface of the bowl to the rim and resting thereon.

Projecting upwardly from one side of the bowl is a rigid support 10 for one member of a ball and socket joint 11, the other member on which is attached to the adjacent end of a substantially horizontal lever 12. This lever normally extends diametrally across and some distance beyond the bowl and carries an operating pad or handle 13 on its outer end. The lever is provided with a knuckle or swivel joint 14 adjacent the rim of the bowl opposite the support so that the portion of the lever projecting beyond the bowl can be turned down when not in use as indicated, thus reducing the space the device will occupy when not in service, while providing a lever of considerable length when in operation.

The lever centrally of the bowl is provided with a large vertical slot 15 through which a sleeve 16 swivelly but non-turnably projects. Turnably mounted in the sleeve but prevented from longitudinal movement relative thereto, is a spindle 17, having opposed and parallel spiral grooves 18 cut therein. A short band 19 surrounds the spindle and is disposed between said spindle and the sleeve. Opposed trunnions 20 fixed in the slotted portion of the lever project through vertical slots 21 in the sleeve, through the band, and into the spiral grooves. A compression spring 22 between the sleeve and the spindle bears at one end on the bottom of the spindle and at the other end against the band to normally force the latter upwardly and to maintain the trunnions at the top of the sleeve slots.

Secured to and depending from the spindle is a hollow cone 23 normally disposed in vertical alinement with the cone 7 and provided on its interior with long shallow ribs 24. This cone is of a size to receive a half fruit to be squeezed, the ribs engaging the skin of the fruit and preventing the same from rotating in the cone. The fruit is ejected after it has been squeezed without the necessity of grasping the same by the fingers or otherwise prying it out by means of a pad 25 mounted in the head of the cone. This pad is connected to a stem 26 projecting upwardly through the spindle and above the sleeve some distance to a knob or button 27. A compression spring 28 between the button and the top of the sleeve normally holds the ejector pad at the top of the cone.

In operation the lever 12 is first raised clear of the cone 7 so as to enable the fruit to be squeezed to be inserted therein, and the lever is then depressed. The initial depressing movement of the lever will cause the ribs 24 to be firmly imbedded in the skin of the fruit, and will also cause the body of fruit to be firmly engaged with the cone 7.

Up to this time the lever and sleeve move as a unit, without any relative movement therebetween, the spring 22 resisting the downward movement of the lever relative to the sleeve. As soon as the fruit is thus engaged with the fixed cone, it will cause a resistance to the further downward movement of the cone 23 to be had as will be evident. A continued downward pressure on the lever will therefore cause the same to move down relative to the sleeve and cone 23. The trunnions mounted in the lever will of course move down also, travelling in the slots 21, and engaging as they do the spiral grooves in the spindle, will obviously cause the latter to be rotated, the spring 22 becoming compressed as the ring 19 moves down with the lever. As a result the fruit will be rotated about the fixed corrugated cone while being held in firm pressing engagement therewith, so that all the juice will be positively and quickly extracted. Such juice will of course percolate through the screen and into the bowl from where it will run into the spout 3 and thence into the vessel 4 placed to receive the juice. As soon as the pressure on the lever is released the spring 22 acts to raise the lever to the topmost position on the sleeve, so that it is then in a position for a further depressing and cone-rotating action.

When the juice has been squeezed out of the fruit the lever is raised and swung to one side clear of the bowl and the button 27 depressed. This causes the pad 25 to engage and push the fruit out of the cone. Another piece of fruit is then inserted in the cone if desired and the operations above described are repeated.

The use of ball and socket joint between the lever and its support enables the cone 23 to be easily turned either to a horizontal or inverted position whenever necessary for cleaning purposes or to insert the fruit. The screen 9 catches the pulp and seeds, and being removable with the cone 7 as a unit enables these parts to be easily cleaned.

A raised supporting surface or table 29 for a fruit is formed with the base to one side of the bowl, and a knife 30 disposed parallel to and adjacent the inner edge of this surface is pivoted at its rear end in connection with the base, so as to bisect a fruit laid on the table and overhanging the knife engaged edge. The knife is provided with an extension handle member 31 having a swivel joint connection 32 with the knife, so that said handle member may be folded over onto the knife when not in use and thus render the device more compact for storing away. The apparatus may be kept freely portable or may be secured to any table or board by screwing the same onto the table, screw holes 33 being provided in the base for this purpose.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A lemon squeezer including a juice catching bowl, a cone removably mounted on and directed supported from the bowl centrally thereof, and a screen secured to the base of the cone and extending to the rim of the bowl and removable with the cone.

2. A lemon squeezer including a juice catching bowl, a cone projecting upwardly from and supported by the bowl, and a removable screen extending from about the base of the cone to and resting on the rim of the bowl.

In testimony whereof I affix my signature.

EDWARD L. MERZOIAN.